Patented Mar. 6, 1951

2,543,867

UNITED STATES PATENT OFFICE 2,543,867

PROCESS OF MAKING PLASTICIZER FOR SYNTHETIC RUBBER BY REACTING A RUBBERY POLYMER OF A DIOLEFIN WITH AN ALKYL MERCAPTAN

James E. Pritchard, Phillips, Tex., assignor to Phillips Petroleum Company, a corporation of Delaware No Drawing. Application August 27, 1945, Serial No. 613,008

5 Claims. (Cl. 260—79.5)

This invention relates to a method for the production of novel plasticizers for use in softening or plasticizing synthetic rubber-like materials, to a novel plasticizer produced thereby, and for plasticizing rubber by the incorporation of such a plasticizer.

Synthetic rubber, produced by the process of emulsion polymerization, is first obtained in the form of a latex. In order to obtain a product exhibiting satisfactory properties, i. e., a rubber which can be readily milled and compounded to give satisfactory physical properties, such as tensile strength and elongation, it has become customary to include in the polymerization recipe small concentrations of materials, called modifiers, which usually consist of organic sulfur compounds of a type known as mercaptans. If too much mercaptan is added to the polymerization recipe, a soft, weak, sticky product is obtained, and it is found that the physical properties of the vulcanizates made from this material are greatly degraded, i. e., the material exhibits low tensile strength and low elongation.

Synthetic rubber, as referred to herein, is intended to include synthetic rubber-like materials made by the emulsion polymerization of conjugated diolefins or butadiene-1,3 hydrocarbons or substituted derivatives thereof, such as the haloprenes, either alone or in admixture with each other or in admixture with each other or with monomers copolymerizable therewith. The term polymer as used herein includes copolymers as well as products of polymerization of a single monomer. Conjugated diolefins include butadiene-1,3 itself and the hydrocarbon homologs thereof such as isoprene, piperylene, 2,3-dimethyl butadiene, and the like. Such monomers include a general readily polymerizable compounds containing an olefinic group, particularly a single olefinic group which is usually activated due to its presence at the end of a chain, as a vinyl group, or a vinylidene group, or in a conjugated system. Monomers suitable for this purpose are, for example, aryl olefins such as styrene, p-chlorostyrene, vinyl naphthalene, etc.; acrylic and substituted acrylic acids and their esters, nitriles and amides such as acrylic acid, methyl acrylate, ethyl acrylate, methyl methacrylate, ethyl methacrylate, acrylonitrile, ethacrylonitrile, methacrylamide and the like; methyl vinyl ether, methyl isopropenyl ketone, vinyl pyridine, vinylidine chloride, vinyl furane, vinyl acetate, diethyl fumarate, etc.

Synthetic rubbers which may be reacted and/or modified in accordance with the present invention also include the alkali metal catalyzed polymers and copolymers of butadiene-1,3 and its related compounds such as isoprene, dimethyl butadiene, piperyline, etc., as for example the sodium polymers. Included herein are also the haloprene type polymers, such as neoprene and the like.

In the manufacture of rubber articles, the usual procedure is to coagulate the rubber from latex, dry it, and then subject the material to a milling operation before incorporating the compounding ingredients such as carbon black, sulfur, antioxidant, and accelerator. It has long been recognized that natural rubber, during milling, undergoes a chemical reaction with atmospheric oxygen, known as oxidative breakdown. The rubber loses its retractivity, and when stretched, separates into long thin threads known as "legs." In reality, the material becomes truly plastic. This chemical breakdown can be conducted on the mill, or, to have electrical energy and time, in large machines called Banburys, or yet, in large extrusion machines called plasticators. The process of oxidative breakdown, however conducted, leads to a decrease in the average molecular weight of the polymer molecules which comprise the substance, rubber. This process is frequently referred to as one of "plasticizing" the rubber and as above indicated generally comprises a softening action.

Synthetic rubber, on the other hand, while treated in almost exactly the same manner as natural rubber is less susceptible to oxidative breakdown and consequently more difficult to mill. Various expedients have been resorted to in order to overcome this defect. The addition of modifiers to the polymerization recipe is an example of such an expedient.

Various softeners, such as pine tar, rosin, synthetic condensation products, and high molecular weight esters have been added to the synthetic rubber on the mill to accomplish this same end. Although the number of such substances tested is legion, and although some of them possess advantages over others when judged on the basis of price or efficiency, it nevertheless remains true that none of them has proved entirely satisfactory. The deleterious effects of these materials on the final phyical properties of the synthetic rubber become manifest at concentrations lower than those required to obtain the desired degree of softening on the mill.

Other means have also been used to secure the desired breakdown on the mill and to accelerate this process. Among these may be mentioned the use of chemical substances, such as "RPA No. 5" (50 per cent zinc salt of an aryl mercaptan in a neutral solvent), and the addition of a portion of overmodified synthetic rubber on the mill. The results of even this latter method, however, have not proved satisfactory in practice, and have always fallen short of anticipations. The amount of this low molecular weight rubber which it has been found necessary to add to secure adequate softening of average or tough polymers has resulted in too high a degradation of the other physical properties of the cured mixture. The relationship between these properties and the amount of overmodified synthetic rubber added has been found to be approximately linear over all practical concentrations.

It is evident from the above discussion that there has been no previous means available which is entirely adequate and satisfactory for working synthetic rubber on the mill and securing the requisite degree of plasticizing and softening action without at the same time adversely affecting the final physical properties of the product. Furthermore it frequently occurs that a large batch of polymer may be produced which is extremely tough, exceeding the limits of present specifications in this respect. The capabilities of previous plasticizing processes are exceeded by such a batch necessitating that it be discarded with attendant economic loss.

In the copending application of Charles F. Fryling, entitled "Plasticizing Synthetic Rubber," Serial No. 613,006, filed concurrently herewith, a method for making a novel plasticizer by the reaction of alkyl mercaptans with a synthetic rubber in the form of latex is disclosed.

I have now discovered a new process for the production of softeners and plasticizers similar or identical in composition and effectiveness to those prepared from latex and mercaptans as described by Fryling. By the method of my invention, soft or syrupy substances which exert a highly effective plasticizing effect on tough synthetic rubbers are prepared by the interaction of mercaptans with rubber-like polymers in the dry state, either with or without oxidizing agents, according to the nature of the polymer used. By my process tough rubbers high in gel content can be utilized as well as normally modified polymer crumbs.

The present invention not only provides an improved method of producing highly superior softeners and plasticizers but it also has the advantage of effecting their production with a minimum of equipment. Furthermore by being applicable to the utilization of tough polymers high in gel content resulting from cross-linkage between the molecular components which are unsuitable for processing as synthetic rubber, my process has a definite economic advantage.

In the operation of my process a synthetic rubber-like polymer of the type described above is coagulated or recovered in solid form and treated in the solid or crumb state with an alkyl mercaptan. In general, the alkyl mercaptan reaction products with conjugated diolefin or butadiene-1,3 type polymers or copolymers may be reacted in the manner described to form the novel plasticizing agents. The alkyl mercaptans which may be used include those having one or more carbon atoms to the molecule and generally include those between $C_1$ and $C_{16}$, either primary, secondary, or tertiary. As preferred reagents, the alkyl mercaptans having 8–16 carbon atoms are utilized.

The reaction between the rubber and the mercaptan is carried out for a period of time and at a temperature sufficient to produce at least one per cent saturation of the double bonds in the rubber by addition of mercaptan thereto. One hundred per cent saturation may be effected if desired, but generally from 5–50 per cent saturation is preferred.

The addition reaction is carried out preferably in the presence of oxygen, air, or minor amounts of oxidizing agents or oxygen-containing catalysts such as peroxides, including benzoyl peroxide or potassium persulfate. The time of reaction will depend on the temperature and on the extent of saturation of double bonds in the rubber desired. Satisfactory conditions may be 40–70 hours or more at 100–150° F. The mercaptans may be utilized in liquid phase, particularly where it is normally liquid, or liquefied under pressure where it is normally gaseous. The reaction may also be carried out with the mercaptans in gas phase at normal, superatmospheric or subatmospheric pressures. While any of the alkyl mercaptans ranging from $C_1$ and higher may be used, among those preferred are ethyl mercaptan, t-butyl mercaptan, n-dodecyl mercaptan, tert-dodecyl mercaptan and the like.

The products obtained by this present process are soft or syrupy substances which are addition products of the alkyl mercaptans wherein the addition has occurred at the double bonds present in the rubber. The physical properties of the product depend on the nature of the polymer and the extent of unsaturation thereof, and on the proportion of double bonds to which addition of mercaptan has taken place. The products are employed by incorporation with the natural or synthetic rubber during milling or other working operation, as described in the aforesaid copending Fryling application.

In plasticizing the rubber using my novel composition it is most common to mill the rubber and plasticizer together through a cold, tight mill. Quantities of 5 to 10 per cent of the plasticizer are commonly incorporated, but the amount used is not critical and will vary with the products formed, type of rubber to be modified, and results desired. In some cases the plasticizer may be used in proportions up to 50 per cent or more. When this procedure is carried out, I have found a most striking change takes place. Breakdown of the rubber by this physical process is immediate, much faster than by the unsatisfactory chemical processes heretofore used. After only two or three passes through the mill the rubber has the appearance of a well masticated sample, has developed long legs, lost its snap and acquired considerable tack.

The plasticizer may be milled in with the polymer at the time it is compounded for vulcanization and does not require a separate operation. Banburys or plasticator machinery may be used instead of a mill, and all standard equipment is applicable.

The plasticizing action is so immediate and complete that I have found it is possible to plasticize very tough rubbers which would otherwise be impractical to work in the mill. The advantages of very high molecular weight linear polymers can thereby be realized in the finished products.

It is an advantage of my process that by this very rapid and immediate breakdown the energy consumption of milling is greatly reduced, and thereby the cost of processing is much less. In the case of the tough rubbers aforementioned it serves to bring them within the range of practicable operation and cost; by other means their use is entirely impracticable. The capacity of the equipment is greatly increased by the rapidity of breakdown in my process, and this constitutes a further advantage of my process.

It is another advantage of my process that a long time for oxidative degradation is not allowed on the mill, and the process of physical softening which occurs is more satisfactory than that obtained by allowing a reaction with oxygen.

The plasticized polymer resembles well worked synthetic rubber in all respects. No effect on working in the carbon black, or other loading materials, antioxidants, etc., is noted. The vulcanized products produced are entirely satisfactory rubbers. Modulus, tensile strength, and elongation fall within the normal desired ranges. Thus, using a sample of GR-S n-dodecyl mercaptan addition product, the product produced when plasticizing with 5 per cent of this composition was approximately equal to one plasticized with 5 per cent of a commercial soft coal tar softener. Hysteresis of the rubbers was also approximately equal.

It is often observed with my new softener that a harder stock is produced when the quantity of softener employed in the milling operation is greater than when a smaller quantity of the softener is used. Thus, for example when 10 parts of a softener prepared by addition of dodecyl mercaptan to GR-S was employed to plasticize 100 parts of an abnormally tough GR-S polymer, the product produced when compounded and cured was harder than when only 5 parts of this softener was used and cured by the same formula. This indicates that much higher loadings of softener can be employed than is ordinarily feasible. Additional confirmation of this is afforded by the somewhat better tensile properties exhibited by the 10 parts stock. There are two factors which may contribute toward this behavior; the softener may take part in the vulcanization of the rubber in view of its high sulfur content, and the fact that the softener can be classified as a vulcanizable plasticizer.

The addition of a large amount of low molecular weight rubber to the batch might be expected to retard the cure. However, there was in the example cited in the paragraph above only a slight evidence of retardation and it may be that this is compensated to a considerable extent by the softener exhibiting an accelerating action on vulcanization. In view of the high sulfur content of the softener, some modification of the curing recipe may at times be necessary. Indeed, it may even be found that sulfur can be left out of the recipe with advantage.

The desirability of vulcanizable plasticizers has been recognized ever since the true nature of vulcanization as a process of cross linking long linear chains with sulfur atoms became known. The theoretical advantages of such plasticizers lie in the fact that their molecules of relatively short chain length would form flexible cross linkages as distinguished from the rigid cross linkages provided by sulfur. My new compositions are unique in this respect and possess many advantages because of this vulcanization property.

The high tensile strength of rubber plasticized with my compositions probably results from the very small amount of working in the mill which is required. In ordinary processing practically all the molecules are probably broken down to some extent, resulting in low tensile strength. In my process, however, the softener is added as required and working on the mill is so slight as to cause little breakdown.

Example I 100 grams of dried GR-S polymer containing 97 per cent gel was heated with 400 cc. n-dodecyl mercaptan in an electric oven at 122° F. Additional mercaptan was added from time to time to keep the polymer moist. After 48 hours the product was washed with isopropyl alcohol to remove unbound mercaptan and dried at 120° F. The product was a translucent colorless syrup which was very tacky and could be drawn into long fine threads. It was completely soluble in benzene and contained 8.1 per cent sulfur corresponding to 39 per cent saturation.

Ten parts of the resulting material when compounded with 100 parts of high Mooney viscosity GR-S on a cold tight mill produces breakdown in from two to three passes on the mill. Without the softener, numerous passes and ten minutes of milling failed to produce comparable breakdown of another sample of GR-S. Plasticization also took place in a shorter time than when using a soft coal tar softener in the same proportions.

Example II 100 grams of dry GR-S polymer containing 97 per cent gel was covered with a solution of benzoyl peroxide in tertiary dodecyl mercaptan (4 mol per cent benzoyl peroxide to 96 mol per cent mercaptan). The mixture was heated in an electric oven at 140° F. for 72 hours, with occasional additions of mercaptan-peroxide solution to maintain a moist condition. The treated polymer was washed free from unbound mercaptan with isopropyl alcohol and dried at 120° F. A soft, pliable, gel-free product was obtained which contained four per cent sulfur and was 13 per cent saturated.

When used in the proportion of 20 parts of plasticizer to 100 parts of high Mooney viscosity GR-S, plasticization and milling are effected in two or three passes and in a substantially shorter time than without the plasticizer or using a coal tar softener.

A sample of GR-S polymer, prepared by polymerizing 75 parts butadiene and 25 parts styrene, according to the standard formula, was selected because of its abnormally tough characteristics which rendered it very difficult to process, and employed in comparative tests with the plasticizer prepared above and with a commonly used soft coal tar plasticizer (BRT #7).

The above examples were carried out using a standard GR-S recipe. This recipe had the following composition:

| | Parts by weight |
|---|---|
| Butadiene | 75 |
| Styrene | 25 |
| Soap | 5 |
| Potassium Persulfate | 0.3 |
| Dodecyl Mercaptan | 0.3 |
| Water | 180 |

The latex was formed by carrying out the polymerization at 122° F. for about 12 hours.

The GR-A rubbers made by copolymerization of acrylonitrile and butadiene are also readily modified in a similar manner.

I claim:

1. A process for the production of a liquid plasticizer for synthetic rubber, which comprises copolymerizing 1,3-butadiene and styrene to produce synthetic rubber and recovering a dry, rubbery polymerization product, reacting said polymerization product with liquid normal dodecyl mercaptan at 100 to 150° F. for a reaction time of 40 to 70 hours in the presence of an oxidizing agent and with an amount of said mercaptan such that said polymerization product is kept moist and the double bonds in said rubbery product are saturated to an extent between 5 and 50 per cent and the resulting product has a syrupy consistency, and recovering a resulting syrupy product.

2. The process of claim 1 wherein said oxidizing agent comprises free oxygen.

3. A process for the production of a liquid plasticizer for synthetic rubber, which comprises forming a rubber-like polymer of a conjugated diolefin, separating a resulting polymerized material in solid form, reacting said solid polymer with a liquid alkyl mercaptan having not more than sixteen carbon atoms per molecule in an amount sufficient to keep said polymer moist during said reaction and to saturate between 5 and 50 per cent of the double bonds in said polymerized material by addition of mercaptan thereto and to produce a liquid syrupy reaction product, at a reaction temperature between 100 and 150° F. and a reaction time between 40 and 70 hours, and in the presence of an oxidizing agent, and recovering a resulting liquid syrupy product.

4. The process of claim 3 wherein said oxidizing agent comprises free oxygen.

5. The process of claim 3 wherein said oxidizing agent comprises benzoyl peroxide.

JAMES E. PRITCHARD.

REFERENCES CITED

The following references are of record in the file of this patent:

UNITED STATES PATENTS

| Number | Name | Date |
|---|---|---|
| 2,234,204 | Starweather | Mar. 11, 1941 |
| 2,411,954 | Burke | Dec. 3, 1946 |
| 2,425,840 | Schulze et al. | Aug. 19, 1947 |
| 2,463,224 | Vincent | Mar. 1, 1949 |
| 2,510,808 | Frolich | June 6, 1950 |

FOREIGN PATENTS

| Number | Country | Date |
|---|---|---|
| 390,532 | Great Britain | Apr. 7, 1933 |